(12) United States Patent
Park

(10) Patent No.: US 9,877,628 B2
(45) Date of Patent: Jan. 30, 2018

(54) VACUUM CLEANER, CONTROL METHOD THEREOF, AND COMPUTER READABLE RECORDING MEDIUM

(71) Applicant: Samsung Electronics Co., Ltd., Suwon-si (KR)

(72) Inventor: Won-gyu Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 30 days.

(21) Appl. No.: 14/854,564

(22) Filed: Sep. 15, 2015

(65) Prior Publication Data

US 2016/0073844 A1   Mar. 17, 2016

(30) Foreign Application Priority Data

Sep. 15, 2014 (KR) .................... 10-2014-0122068

(51) Int. Cl.
| *A47L 9/28* | (2006.01) |
| *A47L 11/40* | (2006.01) |
| *G06F 17/30* | (2006.01) |
| *G06T 7/00* | (2017.01) |
| *A47L 7/00* | (2006.01) |
| *G06K 9/00* | (2006.01) |

(52) U.S. Cl.
CPC .......... *A47L 9/2826* (2013.01); *A47L 7/0061* (2013.01); *A47L 9/2842* (2013.01); *G06F 17/30247* (2013.01); *G06K 9/00664* (2013.01)

(58) Field of Classification Search
CPC .... A47L 9/2816; A47L 7/0061; A47L 9/2842; A47L 11/4011; G06F 7/30247; G06K 9/4652; G06K 9/4604; G06T 7/0085; H04N 7/18
See application file for complete search history.

(56) References Cited

U.S. PATENT DOCUMENTS

| 8,417,383 | B2* | 4/2013 | Ozick ................. G05D 1/0231 700/245 |
| 9,629,514 | B2* | 4/2017 | Hillen ................. A47L 11/4061 |
| 2007/0209143 | A1* | 9/2007 | Choi ..................... A47L 9/2805 15/339 |
| 2009/0126145 | A1* | 5/2009 | D'Agostino .............. A47L 5/28 15/339 |
| 2014/0116469 | A1* | 5/2014 | Kim ..................... A47L 9/2894 134/18 |
| 2014/0124004 | A1* | 5/2014 | Rosenstein ........... A47L 9/2852 134/18 |

FOREIGN PATENT DOCUMENTS

| JP | 2948938 B2 | 9/1999 |
| JP | 2003281550 A | 10/2003 |

* cited by examiner

*Primary Examiner* — Dung Van Nguyen

(57) ABSTRACT

A vacuum cleaner is provided. The vacuum cleaner includes an imaging unit configured to image a floor and generate a captured image, a storage unit configured to store a plurality of pieces of floor information that identify different types of floors and suction intensity information of the vacuum cleaner corresponding to each of the plurality of pieces of floor information, and a controller configured to search for floor information corresponding to the generated captured image among the plurality of pieces of floor information, and control a suction intensity of the vacuum cleaner using suction intensity information corresponding to the searched floor information.

9 Claims, 8 Drawing Sheets

| FLOOR INFORMATION | SUCTION INTENSITY | BRUSH | STERILIZATION |
|---|---|---|---|
| #daa520 | 3 | OFF | OFF |
| #b8860b | 1 | OFF | OFF |
| #ff69b4 | 5 | ON | OFF |
| #fafad2 | 4 | OFF | ON |
| ⋮ | ⋮ | ⋮ | ⋮ |

VACUUM CLEANER, CONTROL METHOD THEREOF, AND COMPUTER READABLE RECORDING MEDIUM

CROSS-REFERENCE TO RELATED APPLICATION(S) AND CLAIM OF PRIORITY

The present application is related to and claims priority from Korean Patent Application No. 10-2014-0122068, filed on Sep. 15, 2014, in the Korean Intellectual Property Office, the disclosure of which is incorporated herein by reference in its entirety.

TECHNICAL FIELD

Apparatuses and methods consistent with exemplary embodiments relate to a vacuum cleaner, a control method thereof, and a computer readable recording medium, and more particularly, to a vacuum cleaner that automatically change a setup thereof by detecting a floor, a control method thereof, and a computer readable recording medium.

BACKGROUND

In general, the floor environment that is cleaned by a vacuum cleaner is diversified. For example, even in the general home environments, a texture for the floor in the house is diversified such as a wooden floor or linoleum, and a material for the wooden floor or linoleum is also diversified such as wood or polyvinyl chloride (PVC). The user spreads a certain mat such as a carpet or a cushion mat in a portion of one room. The vacuum cleaners have been widely used for the purpose of removing dust or mites of bedding.

However, the users manually operate the suction intensity of the vacuum cleaner suitable for various floors with respect to various surfaces to be cleaned by the vacuum cleaner in the related art.

For example, in a mat formed of an elastic material having restoring force, since the strong suction intensity of the suction nozzle, which is in close contact with the mat, causes difficulty in continuous running of the cleaning nozzle, the user has to adjust the suction strength to the week suction intensity. The user adjusts the suction strength to the strong suction intensity in a carpet or rug in which the cleaning is difficult due to the entangled dirt and dust.

Therefore, it is inconvenient for the users to adjust the desired suction intensity one by one according to the floors to be cleaned whenever the users clean the floors.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments relate to a vacuum cleaner that automatically changes a setup thereof by detecting a floor, a control method thereof, and a computer readable recording medium.

To address the above-discussed deficiencies, it is a primary object to provide, for use in a vacuum cleaner including an imaging unit configured to image a floor and generate a captured image; a storage unit configured to store a plurality of pieces of floor information that identify different types of floors and suction intensity information of the vacuum cleaner corresponding to each of the plurality of pieces of floor information; and a controller configured to search for floor information corresponding to the generated captured image among the plurality of pieces of floor information, and control a suction intensity of the vacuum cleaner using suction intensity information corresponding to the searched floor information.

The floor information includes at least one piece of information of a color and pattern of the floor. The controller is further configured to search for the floor information corresponding to the generated captured image by analyzing the at least one piece of information of the color and pattern of the floor in the captured image.

The vacuum cleaner further includes a manipulator configured to receive a suction intensity in which the vacuum cleaner performs suction on a surface to be cleaned in the floor. The controller is further configured to store the floor information corresponding to the captured image and the suction intensity that is received through the manipulator corresponding to the floor information.

In response to the suction intensity information corresponding to the floor information being pre-stored, the controller is further configured to update the pre-stored suction intensity information to the received suction intensity.

The controller is further configured to detect a corner region from the captured image, and the controller is further configured to increase the suction intensity of the vacuum cleaner in response to the corner region being detected.

The storage unit is further configured to store protrusion state information of a brush corresponding to each of the plurality of pieces of floor information. The controller is further configured to control a protrusion state of the brush in the vacuum cleaner using the protrusion state information of the brush corresponding to the searched floor information.

The storage unit is further configured to store setup information of a sterilizing function corresponding to each of the plurality of pieces of floor information. The controller is further configured to control the sterilizing function of the vacuum cleaner using the setup information of the sterilizing function corresponding to the searched floor information.

The vacuum cleaner further includes: a main body configured to suck air and collect dust in the air; a suction nozzle assembly configured to be in contact with the floor and suck the air; an extension passage configured to couple the main body and the suction nozzle assembly, and transfer the air sucked from the floor to the main body; and a handle member located in one side of the extension passage and griped by a user. The imaging unit is provided in the handle member and further configured to capture the floor around the suction nozzle assembly.

The vacuum cleaner further include: a main body configured to suck air and collect dust in the air; a suction nozzle assembly configured to be in contact with the floor and suck the air; an extension passage configured to couple the main body and the suction nozzle assembly, and transfer the air sucked from the floor to the main body; and a handle member located in one side of the extension passage and griped by a user. The imaging unit is provided in the suction nozzle assembly and further configured to capture the floor around the suction nozzle assembly.

According to an aspect of an exemplary embodiment, there is provided a method of controlling a vacuum cleaner, the method including: generating a captured image by imaging a floor; searching for floor information corresponding to the generated captured image among a plurality of pieces of floor information that are pre-stored and identify different types of floors using the plurality of pieces of floor information and suction intensity information of the vacuum cleaner corresponding to each of the plurality of pieces of floor information; and controlling a suction intensity of the vacuum cleaner using suction intensity information corresponding to the searched floor information.

The floor information includes at least one piece of information of a color and pattern of the floor. The searching includes searching for the floor information corresponding to the generated captured image by analyzing the at least one piece of information of the color and pattern of the floor in the captured image.

The method further includes: receiving a suction intensity in which the vacuum cleaner performs suction on a surface to be cleaned in the floor; and storing the floor information corresponding to the captured image and the received suction intensity corresponding to the floor information corresponding to the captured image.

The method further includes, in response to the suction intensity information corresponding to the floor information being pre-stored, updating the pre-stored suction intensity information to the received suction intensity.

The method further includes: detecting a corner region from the captured image; and increasing the suction intensity of the vacuum cleaner in response to the corner region being detected.

The controlling includes controlling a protrusion state of a brush in the vacuum cleaner using pre-stored protrusion state information of the brush corresponding to each of plurality of pieces of floor information.

The controlling includes controlling a sterilizing function of the vacuum cleaner using pre-stored setup information of the sterilizing function corresponding to each of the plurality of pieces of floor information.

According to an aspect of an exemplary embodiment, there is provided a computer readable recording medium including program for executing a method of controlling a vacuum cleaner, the method including: generating a captured image by imaging a floor; searching for floor information corresponding to the generated captured image among a plurality of pieces of floor information that are pre-stored and identify different types of floors using the plurality of pieces of floor information and suction intensity information of the vacuum cleaner corresponding to each of the plurality of pieces of floor information; and controlling a suction intensity of the vacuum cleaner using suction intensity information corresponding to the searched floor information.

Additional aspects and advantages of the exemplary embodiments are set forth in the detailed description, and will be obvious from the detailed description, or may be learned by practicing the exemplary embodiments.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Hereinafter, the exemplary embodiments are described in greater detail with reference to the accompanying drawings.

In the following description, unless otherwise described, the same reference numerals are used for the same elements when they are depicted in different drawings. The matters defined in the description, such as detailed construction and elements, are provided to assist in a comprehensive understanding of the exemplary embodiments. Thus, it is understood that the exemplary embodiments can be carried out without those specifically defined matters. Also, functions or elements known in the related art are not described in detail since they would obscure the exemplary embodiments with unnecessary detail.

Figure 1:
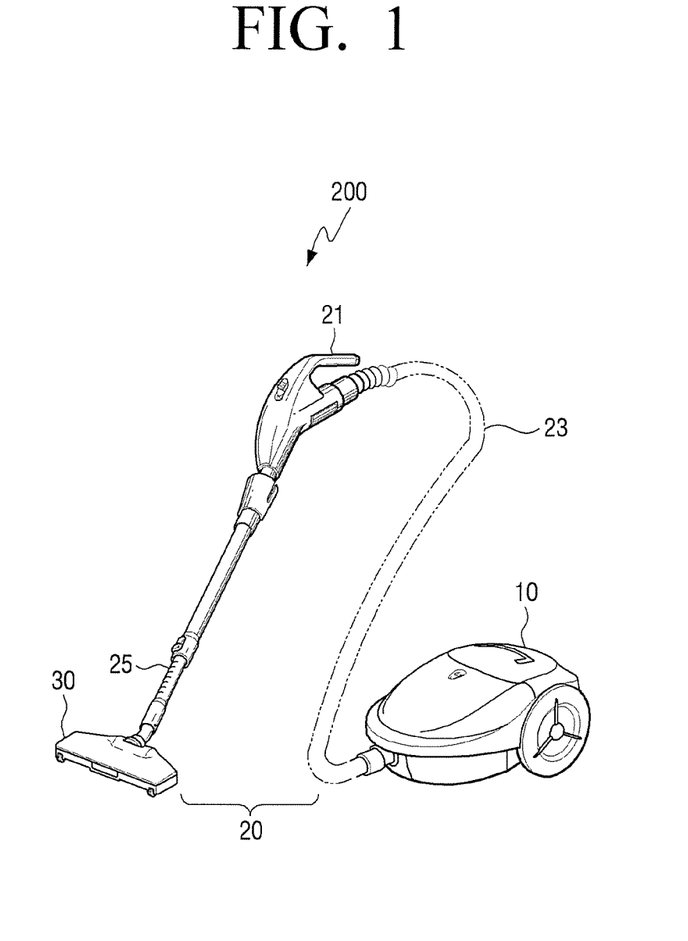
FIG. 1 illustrates a configuration of a vacuum cleaner according to various embodiments of the present disclosure.

FIG. 1 is a block illustrating a configuration of a vacuum cleaner according to an exemplary embodiment.

Referring to FIG. 1, a vacuum cleaner 200 includes a main body 10, an extension passage 20, and a suction nozzle assembly 30.

The main body 10 sucks air and collects dust in the sucked air. For example, the main body 10 includes a suction force generator such as a suction motor (not shown) that sucks air from the outside and a dust collector that separates dust or dirt from the sucked air and collects the separated dust or dirt. A function and operation of the main body 10 are generally known, and the detailed description thereof will be omitted.

The main body 10 includes a controller that controls configuration components of the vacuum cleaner and a storage unit. Operations of the controller and storage unit will be described with reference to FIG. 2 later.

The extension passage 20 couples the main body 10 and the suction nozzle assembly 30, and transfers the air sucked from the floor to the main body 10. The extension passage 20 includes a handle member 21, an extension hose 23, and an extension tube 25.

The handle member 21 is provided in one side of the extension passage 20 and is griped by the user. For example, the handle member 21 is located to the one side of the extension tube 25 and includes a shape to be griped by a hand of the user.

The handle member 21 includes a manipulator configured to be griped by the user and input a setup of the vacuum cleaner 200 and an imaging unit configured to capture a floor and generate a captured image. Detailed description for the manipulator and the imaging unit will be described with reference to FIG. 2 later. The exemplary embodiment has described that the imaging unit is attached to the handle member 21, but the imaging unit is implemented to be disposed in various positions in which the floor facing with the suction nozzle assembly 30 is captured such as the extension tube 25 other than the handle member 21.

The extension hose 23 couples the handle member 21 and the main body 10. For example, the extension hose 23 is formed of a flexible material, and the user ensures a cleaning direction in cleaning.

The extension tube 25 couples the handle member 21 and the suction nozzle assembly 30. For example, the extension tube 25 is formed of a rigid material so that the suction nozzle assembly 30 coupled to the extension tube 25 is located according to a direction of the griped handle member 21. The extension tube 25 is configured of two stages, and a length of the extension tube 25 is reduced and increased to a direction parallel to a longitudinal direction of the extension tube 25.

The suction nozzle assembly 30 faces the surface to be cleaned in the floor and suck the dust on the floor. For example, the suction nozzle assembly 30 sucks air on the surface to be cleaned by suction force of the main body 10 transferred by the extension passage 20. The suction nozzle assembly 30 includes at least one brush configured to brush a floor surface.

Both shaft ends of the brush are rotatably supported to an inner side of the suction nozzle assembly 30 and are exposed to the outside. A brush member is implanted into an outer circumferential surface of the brush. The brush member separates the dirt attached onto the surface to be cleaned from the floor surface while the brush member is rotated by the suction nozzle assembly 30 traveling along the surface to be cleaned.

The suction nozzle assembly 30 is implemented to further include a sub brush. The sub brush is a member configured to scrape the surface to be cleaned such as a carpet like a comb and separate the dirt from the surface to be cleaned. The sub brush is rotatably supported inside a suction inlet of the suction nozzle assembly 30, and the sub brush is contained inside the suction nozzle assembly 30 or protrudes from the surface to be cleaned.

The suction nozzle assembly 30 further includes a sterilizer configured to perform a sterilizing function to sterilize bacteria or mites existing on the surface to be cleaned. For example, the sterilizer includes an ultraviolet (UV) lamp configured to irradiate UV rays to the surface to be cleaned. In another example, the sterilizer includes a heater or an ozone generator configured to release heat for sterilization.

The vacuum cleaner according to the embodiment automatically detects the floor based on the setup history of the user for the vacuum cleaner and set the suction intensity, the protrusion of the brush, and the sterilizing function in response to different types of floors being cleaned. Therefore, the convenience of the user is ensured.

Figure 2:
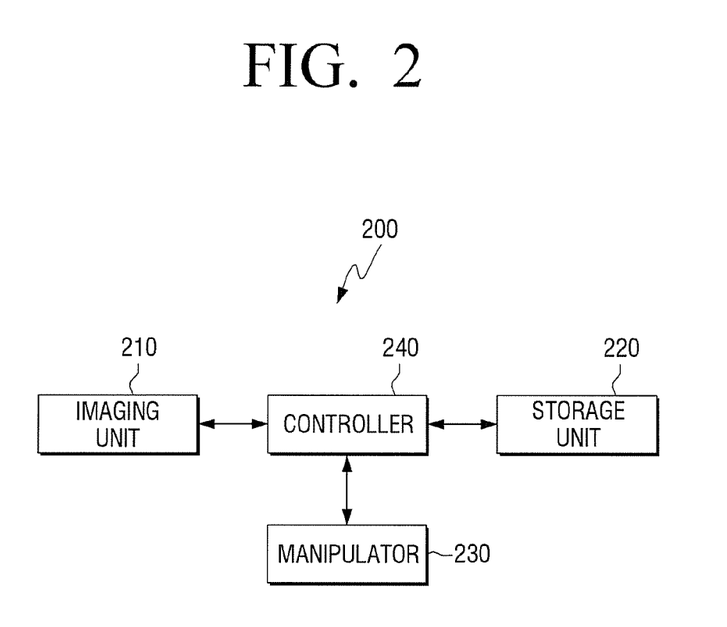
FIG. 2 illustrates a configuration of a vacuum cleaner according to various embodiments of the present disclosure.

FIG. 2 is a block diagram illustrating a configuration of a vacuum cleaner according to an exemplary embodiment.

Referring to FIG. 2, the vacuum cleaner 200 includes an imaging unit 210, a storage unit 220, a manipulator 230, and a controller 240.

The imaging unit 210 generates a captured image by imaging a floor. For example, the imaging unit 210 generates the captured image by capturing the floor around the suction nozzle assembly 30.

The imaging unit 210 includes a lens configured to form an optical image in an imaging region by collecting light incident to an object from the floor, an imaging element configured to perform photoelectric conversion on the light incident through the lens to an electrical signal, and an analog to digital (A/D) converter configured to an analog signal of the imaging element to a digital signal and output the digital signal. The imaging element includes a charge-coupled device (CCD) imaging element and a complementary metal oxide semiconductor (CMOS) imaging element.

The imaging unit 210 is disposed in the handle member 21 or the suction nozzle assembly 30 of the vacuum cleaner to capture the floor to be cleaned.

The storage unit 220 stores a plurality of pieces of floor information that identify different types of floors and suction intensity information of the vacuum cleaner corresponding to each of the plurality of pieces of floor information. For example, the storage unit 220 stores a look-up table having the plurality of pieces of floor information and the suction intensity information corresponding to each of the plurality of pieces of floor information. The floor information is the captured image itself or is information such as a color of the floor and a pattern of the floor. The pattern of the floor is frequency information in the captured image. For example, the pattern of the floor is a periodicity that is calculated by analyzing two-dimensional (2D) frequency on the captured image and calculating correlation. In another example, the algorithm that extracts interest points from the captured image and identifies the pattern according to a position and distance (vector) between pixels and a relative pixel value difference is used.

The suction intensity information is information for a suction intensity input through the user manipulator 230.

The look-up table is information corresponding to the plurality of pieces of floor information. The look-up table further stores brush protrusion state information and setup information of a sterilizer function. An example of the look-up table will be described in detail with reference to FIG. 5 later.

The storage unit 220 stores the suction intensity information corresponding to a corner.

The storage unit 220 is implemented with a storage medium inside the main body 10 and an external storage medium. For example, the storage unit 220 includes a read only memory (ROM), a random access memory (RAM), or a memory card (for example, a secure digital (SD) card or a memory stick) attachable to or detachable from the main body 10. In another example, the storage unit 220 includes a nonvolatile memory, a volatile memory, a hard disc drive (HDD), or a solid state drive (SDD). In another example, the storage unit 220 is implemented with a removable disc including a universal serial bus (USB) memory, a web server through a network, and the like.

The manipulator 230 receives an input of the user. For example, the manipulator 230 receives the suction intensity in which the vacuum cleaner 200 performs suction on the surface to be cleaned in the floor.

The manipulator 230 is implemented through an input of an individual button for suction strength that sets the suction intensity. For example, the manipulator 230 is implemented with a touch button that adjusts the suction strength through a slide operation for moving a member by a preset distance or detects a touch of the user. In another example, the manipulator 230 is implemented with a single button configured to adjust the suction strength in a form in which the suction intensity is increased as a number of pressing the button is increased, and then initialized when the number of pressing the button is reached to a preset maximum level.

The manipulator 230 further includes a button that sets the protrusion of a brush configured to brush the surface to be cleaned, a button that executes a sterilizing function to sterilize bacteria on the surface to be cleaned or sucked bacteria, a button that stops the operation, and the like, which are provided in the suction nozzle assembly 30.

The manipulator 230 is disposed in the handle member 21 of the vacuum cleaner so that the user easily operates the manipulator 230 even in a state in which the user grips the handle member 21.

Although not shown in FIG. 2, a user command input through the manipulator 230 is transferred to the components of the vacuum cleaner 200 through a radio frequency (RF) signal or a wired signal.

The controller 240 controls the configuration components of the vacuum cleaner 200. For example, the controller controls the suction intensity so that the vacuum cleaner 200 operates with suction force corresponding to the suction intensity operated by the user in turn-on. The controller 240 controls the imaging unit 210 to identify the floor. The imaging operation is performed in a preset time cycle. The imaging operation is performed at a point of time when the manipulation of the user is changed.

In response to a floor surface being captured through the imaging unit 210, the controller 240 searches for floor information corresponding to a current floor by comparing the captured floor image with pre-stored floor information and controls the suction intensity of the vacuum cleaner 200 according to the suction intensity information corresponding to the searched floor information.

The controller 240 searches for the floor information corresponding to the generated captured image by analyzing at least one piece of floor information of a color and pattern of the captured image generated in the imaging unit 210.

In response to the pre-stored floor information corresponding to the captured floor image being not searched for, the controller 240 stores the floor information corresponding to the currently captured floor image and suction intensity information, which is corresponding to a current suction intensity and associated with the floor information, in the storage unit 220.

In response to setup information of the vacuum cleaner being input to the manipulator 230 in the state in which the pre-stored floor information corresponding to the captured floor image is not searched, the controller 240 stores the setup information by corresponding with the floor image corresponding to the captured image. It has been described that the information storing point of time is determined according to whether or not the corresponding floor image is searched for, but the controller is implemented to store the information in the storage unit in response to the setup change of the user. For example, in response to at least one among an input for setting an suction intensity, an input for setting protrusion of the brush, and an input for setting a sterilizing function being input through the manipulator 230, the controller 240 controls the imaging unit 210 to capture the floor and generate the captured image, and the controller 240 analyzes the floor information from the captured image and stores the analyzed information in the storage unit 220 by corresponding with at least one of the suction intensity, the protrusion of the brush, and the sterilizing function input to the manipulator 230. In response to the floor information corresponding to the captured image being searched for, the controller 240 updates the suction intensity information corresponding to the pre-stored floor information to the currently input suction intensity.

The controller 240 detects a corner region from the captured image. The controller 240 changes the suction intensity of the vacuum cleaner 200 in response to the corner region being detected. For example, the controller 240 analyzes that the corner of the floor is captured from the captured image. In this example, the controller 240 determines the corner region by identifying a tangent that the floor meets a wall. The controller 240 determines the corner region by identifying an amount of light reflected from the corner differently from an amount of light reflected from the floor and wall surface.

The controller 240 increases the suction intensity of the vacuum cleaner 200 in response to the corner region being detected, and the suction nozzle assembly 30 being moved to the detected corner region. In general, it is difficult to clean the corner region, and a lot of dust or dirt builds up in the corner region. Since it is difficult to directly dispose the suction nozzle assembly on the corner region, the user cleans the corner region by increasing the suction strength of the vacuum cleaner 200 through the controller 240.

The embodiment has described that the suction intensity is uniformly increased in response to the corner region being detected, but the vacuum cleaner is implemented to classify the types (or floors) of the corner regions, store the classified types of floor, and perform cleaning as an suction intensity corresponding to a corresponding floor and the corner of the floor.

The exemplary embodiment has described that the controller 240 identifies the floor using only the image captured in the imaging unit 210, but the vacuum cleaner is implemented to identify the floor using a pressure sensor inside the main body 10 or a sensor configured to detect a material of the floor and disposed in the suction nozzle assembly 30.

For example, since amount of air sucked into the suction inlet of the suction nozzle assembly 30 are changed due to material properties of the different types of floors, the controller 240 searches for floor information using internal atmospheric pressure of the vacuum cleaner at a specific suction intensity sensed through the pressure sensor.

The controller 240 includes a central processing unit (CPU), a ROM in which control program for controlling the vacuum cleaner 200 is stored, and a RAM that temporarily stores an external input signal or data or is used for a storage region for functions performed in the vacuum cleaner 200. The CPU includes a single core processor or a multi-core processor such as a dual-core processor, or a quad-core process. The CPU, ROM, and RAM are mutually connected through a bus.

The vacuum cleaner 200 according to an exemplary embodiment automatically changes the suction intensity according to floors based on the setup information history set in using of the vacuum cleaner 200 by the user, and the convenience is ensured to perform cleaning without a separate input through the setup of the vacuum cleaner more suitable for the environment of the user.

Figure 3:
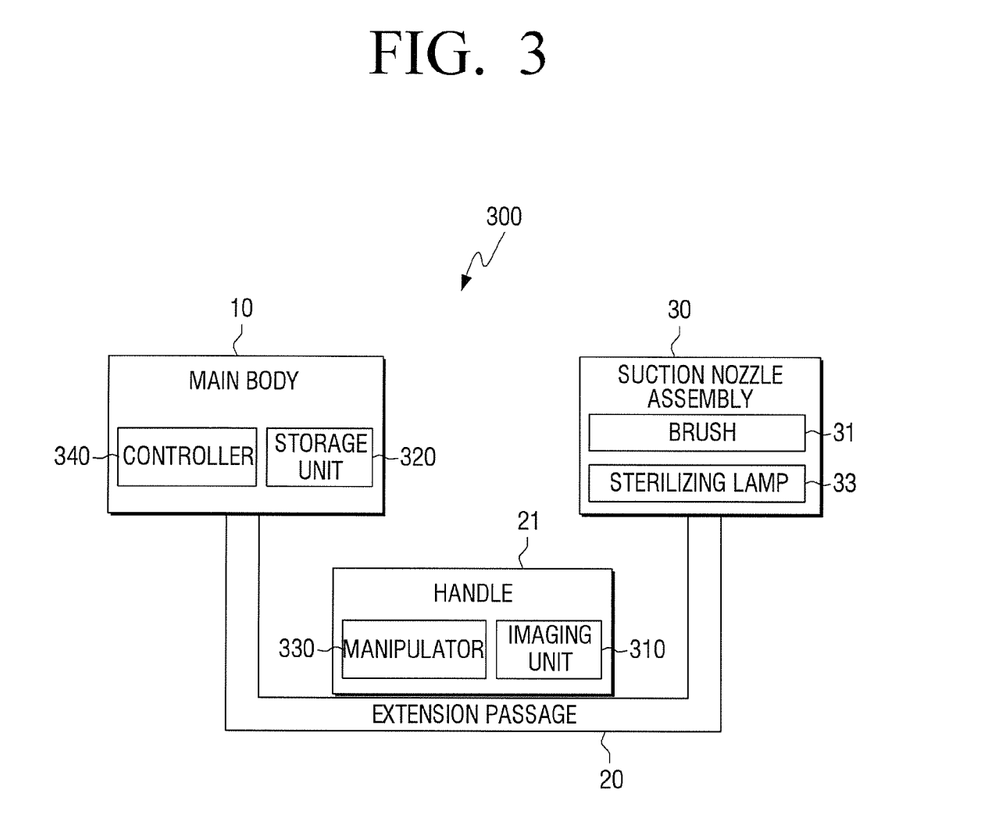
FIG. 3 illustrates an arrangement structure of a vacuum cleaner according to various embodiments of the present disclosure.

FIG. 3 is a diagram illustrating an arrangement structure of a vacuum cleaner according to an exemplary embodiment.

Referring to FIG. 3, a vacuum cleaner 300 includes a main body 10, an extension passage 20, a handle member 21, and a suction nozzle assembly 30.

A storage unit 320 and a controller 340 described in FIG. 2 are arranged in the main body 10. For example, a suction force generator such as a suction motor (not shown) is built in the main body 10, and a power connector (not shown) configured to receive power is included in the main body 10. Therefore, the controller 340 configured to control the configuration components of the vacuum cleaner 300 and the storage unit 320 that the floor information and setup information of the vacuum cleaner are read therefrom and written thereto is built in the main body 10 and receives the power. A data communication length between the storage unit 320 and the controller 340 is reduced.

An imaging unit 310 and a manipulator 330 are arranged in the extension passage 20. For example, the imaging unit 310 and the manipulator 330 are arranged in the handle member 21. Specifically, the manipulator 330 is included in the handle member 21 provided in one side of the extension passage 20 so that the user operates the manipulator 330 while the user grips the handle member 21.

The manipulator 330 includes one or a plurality of buttons and the like in a location in which the setup of the vacuum cleaner 300 is input through only the simple operation of a finger while the user grips the handle member 21.

The imaging unit 310 is provided in the handle member 21, and the user controls the imaging unit 310 to capture the floor in a direction by orienting the suction nozzle assembly 30 using the handle member 21. For example, the handle member 21 is coupled to the suction nozzle assembly 30 that faces the surface to be cleaned through the extension tube 25 of the extension passage 20. The suction nozzle assembly 30 is directed to a direction to be cleaned by the user who grips the handle member 21, and a location of a floor, which is captured by the imaging unit 310 provided in the handle member 21, is directed to the floor to be cleaned by the user around a location in which the suction nozzle assembly 30 is located.

The captured image for the floor captured in the imaging unit 310 is transferred to the controller as a RF signal or in a cable signal like the user command of the manipulator 330.

The suction nozzle assembly 30 includes a brush 31 configured to clean the surface to be cleaned and a sterilizing lamp 33 configured to sterilize bacteria on the surface to be cleaned. The exemplary embodiment illustrated in FIG. 3 has described that the suction nozzle assembly 30 includes both the brush and sterilizing lamp, but the suction nozzle assembly is implemented to include only one of the brush and the sterilizing lamp. In another example, the brush and the sterilizing lamp may not be included in the suction nozzle assembly 30.

The cleaning is performed by separating dust and dirt from the floor through the brush 31 configured to performing sweeping on the surface to be cleaned in the floor. The brush 31 is included in the suction nozzle assembly 30 together with the suction force transferred to the suction inlet of the suction nozzle assembly 30 from the main body 10 through the extension passage 20.

FIG. 3 illustrates that one brush 31 is included in the suction nozzle assembly 30, but the suction nozzle assembly 30 is implemented to include a plurality of brushes.

The sterilizing lamp 33 is provided in the suction nozzle assembly 30 to perform sterilization on the surface to be cleaned. For example, the sterilizing lamp 33 sterilizes bacteria and mites that exist on the surface to be cleaned and in the sucked air by irradiating UV rays.

The exemplary embodiment in FIG. 3 illustrates that the sterilizer provided in the suction nozzle assembly 30 is the sterilizing lamp 33, but the sterilizer is implemented to include a heater or an ozone generator configured to release heat for sterilization.

In the arrangement structure of the configuration components in the vacuum cleaner according to an exemplary embodiment, the imaging unit 310 easily captures the floor, and the controller 340 effectively controls the storage unit 320 of the main body 10 and the suction intensity of the suction motor.

The exemplary embodiment in FIG. 3 has described that the imaging unit 310 is arranged in the extension passage. However, the imaging unit 310 is implemented to be arranged in another region other than the extension passage 20 in that the imaging unit 310 images the floor surface in which the suction nozzle assembly 30 is located. Hereinafter, an exemplary embodiment that the imaging unit 310 is located in the suction nozzle assembly 30 will be described with reference to FIG. 4.

Figure 4:
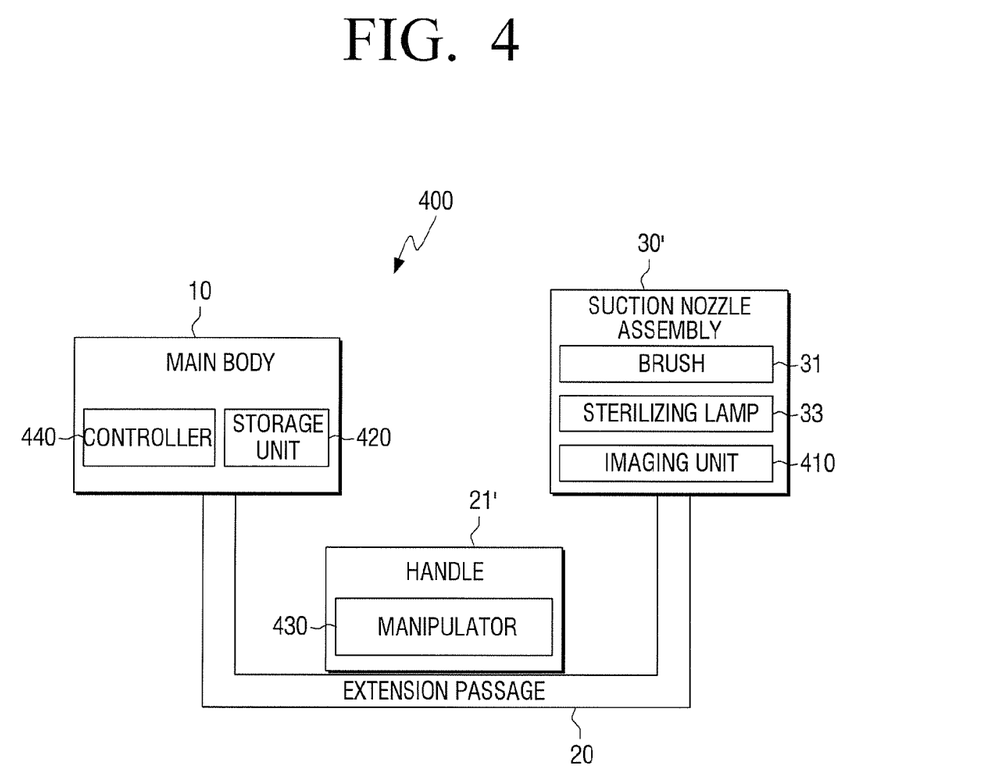
FIG. 4 illustrates an arrangement structure of a vacuum cleaner according to various embodiments of the present disclosure.

FIG. 4 is a diagram illustrating an arrangement structure of a vacuum cleaner according to another exemplary embodiment.

Referring to FIG. 4, a vacuum cleaner 400 includes a main body 10, an extension passage 20, a handle member 21', and a suction nozzle assembly 30'.

The main body 10 includes a controller 440 and a storage unit 420. An operation and function of the main body 10 are the same as those of the main body 10 in FIG. 3, and thus overlapping description thereof will be omitted.

A manipulator 430 is arranged in the extension passage 20. For example, the manipulator 430 is arranged in the handle member 21'. Specifically, the manipulator 430 is included in the handle member 21' provided in one side of the extension passage 20 so that the user operates the manipulator 430 while the user grips the handle member 21'.

The suction nozzle assembly 30' includes an imaging unit 410, a brush 31, and a sterilizing lamp 33. An operations of the brush 31 and the sterilizing lamp 33 are the same as those of the brush 31 and the sterilizing lamp 33 in FIG. 3, and thus overlapping description thereof will be omitted The imaging unit 410 is provided in the suction nozzle assembly 30' to capture the floor. The imaging unit 410 images the surface to be cleaned in the floor that is cleaned by the suction nozzle assembly 30'. The imaging unit 410 is included to capture the floor in a posture in which the suction nozzle assembly 30' faces the floor.

The captured image of the floor captured and generated in the imaging unit 410 is transferred to the controller 440 as a RF signal or in a wired signal.

In the arrangement structure of the configuration components in the vacuum cleaner 400 according to an exemplary embodiment, the imaging unit 410 captures the floor in a location closest to the floor, and thus interference and noise due to a peripheral environment, which is input to the imaging unit 410, is slight, and more shape and precise captured image for the floor is obtained.

Figure 5:
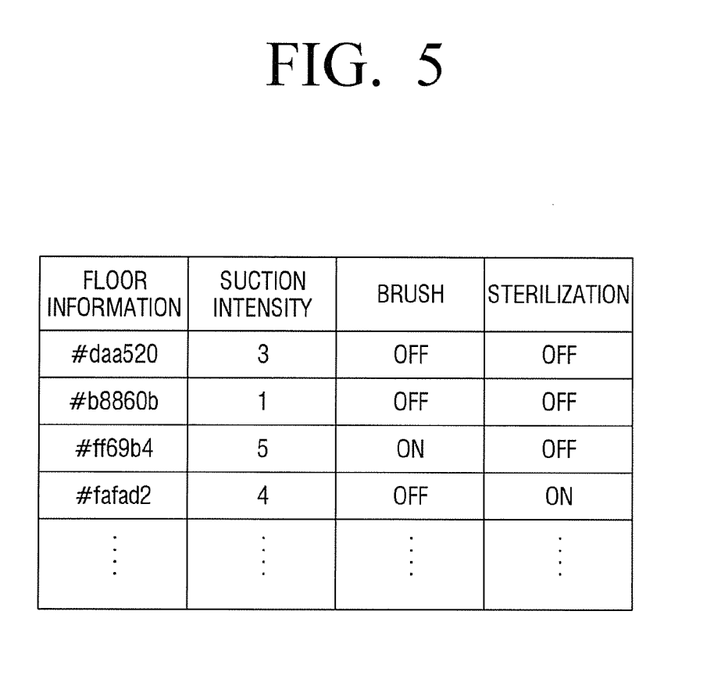
FIG. 5 illustrates an example of a look-up table that stores floor information and setup information of a vacuum cleaner according to various embodiments of the present disclosure.

FIG. 5 is a diagram illustrating an example of a look-up table that stores floor information and setup information of a vacuum cleaner according to an exemplary embodiment.

Referring to FIG. 5, the look-up table has a plurality of pieces of floor information, pieces of suction intensity information, pieces of protrusion state information of a brush, and pieces of setup information of a sterilizing function, which are corresponding to the plurality of pieces of floor information.

The floor information is information that identifies the different types of floors and includes a color and pattern of the floor. For example, as the floor information for a wooden floor, color information of a captured image for the floor is stored as #daa520, which is a RGB color code. In another example, 2D pixels values for analysis of the pattern in the captured image for the floor are frequency-converted data.

As the setup information of the vacuum cleaner corresponding to each of the plurality of pieces of floor information, setup values for strength of an suction intensity, ON/OFF of a brush, and ON/OFF of a sterilizing function are stored in the same row.

For example, the setup information of the vacuum cleaner corresponding to the floor information of the wooden floor, in which the strength of the suction intensity is level three, the setup of the brush is OFF, the setup of the sterilizing function is OFF, is stored. In response to the wooden floor being cleaned by the vacuum cleaner, the vacuum cleaner sets the setup information of the vacuum cleaner, in which the strength of the suction intensity is level three, the setup of the brush is OFF, the setup of the sterilizing function is OFF, by searching for the floor information for the wooden floor and calling the setup information of the vacuum cleaner corresponding to the searched floor information for the wooden floor. In this example, the vacuum cleaner controls a suction force generator to correspond to the strength of the suction intensity having level three, control the brush not to protrude toward the outside, and control the sterilizer for sterilization not to be operated.

Figure 6:
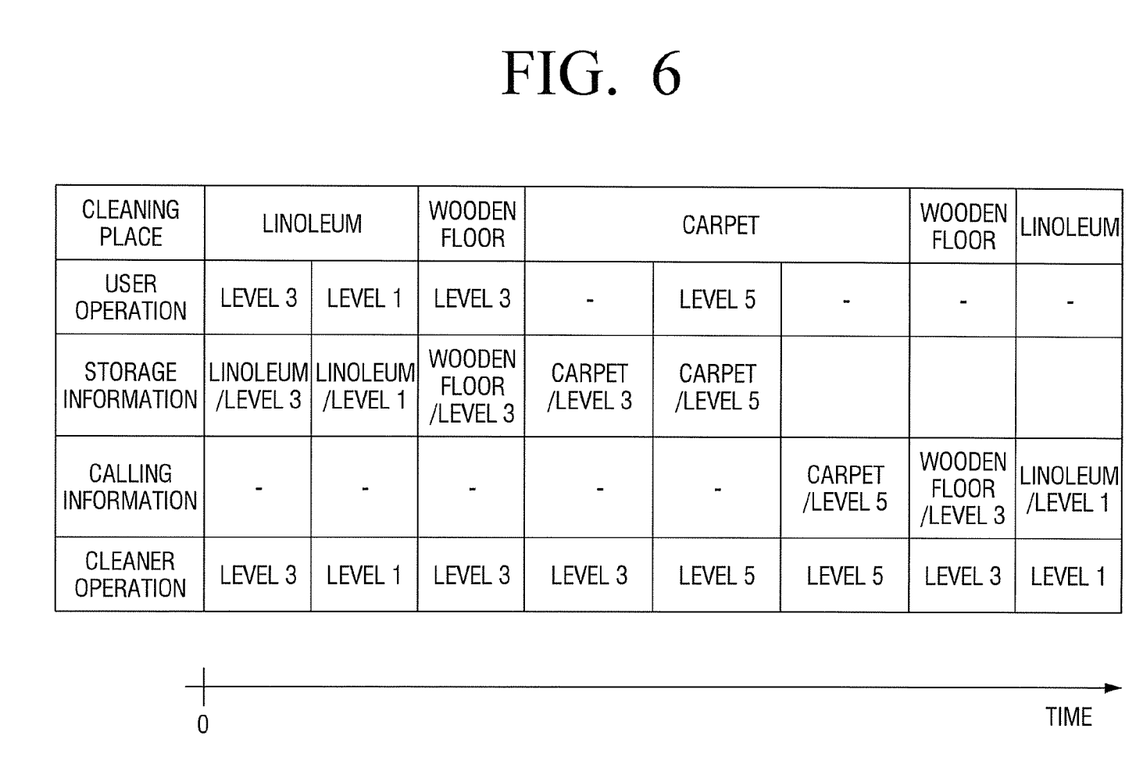
FIG. 6 illustrates an operation example of a vacuum cleaner in various floor environments according to various embodiments of the present disclosure.

FIG. 6 is a diagram illustrating an operation example of a vacuum cleaner in various floor environments according to an exemplary embodiment.

Referring to FIG. 6, a series of cleaning operations performed in the vacuum cleaner according to an exemplary embodiment is classified by a cleaning place indicating a floor to be cleaned, a user operation indicating a suction intensity of the vacuum cleaner input by the user, storage information indicating floor information and a suction intensity stored in the vacuum cleaner, calling information indicating floor information and suction intensity information called from the plurality of pieces of stored information, and an cleaner operation indicating a suction intensity in which the vacuum cleaner sucks air together with dust.

FIG. 6 illustrates that the user performs the cleaning by moving to the cleaning places in order of linoleum, wooden floor, carpet, wooden floor, and linoleum.

In response to starting of the cleaning from the linoleum, the user inputs a command for controlling the suction intensity to the suction strength of level three, and the floor information and the suction intensity information of level three for the linoleum is stored. Then, in response to an input for changing the suction strength of the suction intensity for the linoleum to level one being performed by the user, the suction intensity information for the linoleum is updated to level one.

In response to the cleaning place being changed to the wooden floor, and an input for changing the strength of the suction intensity to level three for the cleaning of the wooden floor being input by the user, the vacuum cleaner is operated as the suction intensity of three level, and the suction intensity information of three level together with the floor information for the wooden floor is stored.

In response to the cleaning place being changed to the carpet, and the cleaning being performed as the suction intensity of level three without the operation for the strength of the suction intensity by the user, the floor information of the carpet analyzed from an captured image for the carpet that is captured after the preset cycle for imaging the floor, and the suction intensity information of level three as the strength for the currently set suction intensity is stored.

In response to an input for changing the strength of the suction intensity to level five being input by the user during the cleaning of the carpet, the vacuum cleaner recognizes a preset event as the user input and stores the suction intensity information changed to level five together with the floor information for the carpet. The suction intensity information corresponding to the pre-stored floor information for the carpet is updated to level five.

While the user still cleans the carpet after the preset cycle for imaging the floor, the vacuum cleaner analyzes floor information from the captured image for the carpet and searches for the floor information corresponding to the carpet among the pieces of preset floor information, and calls the searched floor information for the carpet and the suction strength of level 5 that is the suction intensity information corresponding to the carpet.

The user moves to the wooden floor again and performs cleaning on the wooden floor, and the vacuum cleaner searches for floor information for the wooden floor from the captured image for the wooden floor that is captured after the preset time, and calls the strength of the suction intensity of level three corresponding to the searched wooden floor. The vacuum cleaner performs cleaning as the suction intensity corresponding to the called strength of the suction intensity of level three.

The user moves to the linoleum as the cleaning place again and performs cleaning on the linoleum. The vacuum cleaner searches for floor information for the linoleum from a captured image for the linoleum captured after the preset cycle. The vacuum cleaner calls the suction intensity information of level one corresponding to the searched floor information for the linoleum and performs cleaning on the linoleum as the suction intensity corresponding to the called strength of the suction intensity of level one.

The exemplary embodiment has illustrated that the cleaning is performed based on the kinds of floors and the suction strength according to the user operation using the vacuum cleaner, but the vacuum cleaner recognizes a corner region from the captured image for the floor and perform the cleaning on the corner region of the floor as the changed suction intensity. For the clarity, the explicit names for the kinds of floors such as linoleum, wooden floor, or carpet are used in FIG. 6, but the information stored in and called from the vacuum cleaner is information that identifies different floors, such as the color or pattern information for the floor.

For example, the preset cycle for imaging the floor is constant. In another example, the cycle for imaging the floor is changed according to the floor information.

Figure 7:
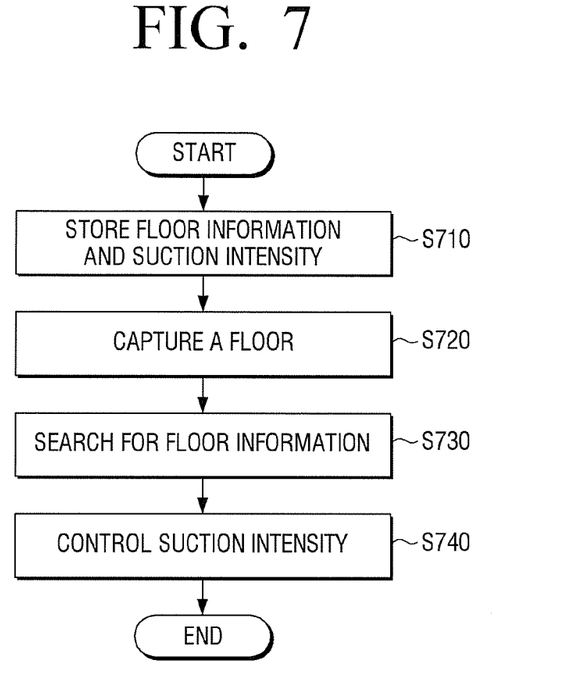
FIG. 7 illustrates a control method of a vacuum cleaner according to various embodiments of the present disclosure.

FIG. 7 is a flowchart illustrating a control method of a vacuum cleaner according to an exemplary embodiment.

Referring to FIG. 7, according to the control method of a vacuum cleaner, the vacuum cleaner stores a plurality of pieces of floor information that identify different types of floors and pieces of suction intensity information of the vacuum cleaner corresponding to the plurality of pieces of floor information in operation S710. The stored floor information is information for at least one of a color and pattern of the floor. The pattern of the floor is a repetitive period of the pattern or an analyzed value of captured image data for the floor in a frequency domain.

The stored floor information and suction intensity is suction strength of the suction intensity for the surface to be cleaned in the floor, which is input by the user, and the floor information analyzed from the captured image for the floor. The stored floor information and suction intensity is new floor information acquired by imaging the floor every preset cycle and suction intensity information set to the vacuum cleaner.

The stored setup information of the vacuum cleaner further includes protrusion state information of a brush or setup information of a sterilizing function in addition to the suction intensity information.

In operation S720, the vacuum cleaner captures the floor and generates a captured image. The captured image is an image in which an optical image formed by light of the floor that passes through a lens is converted into image data.

In operation S730, the vacuum cleaner searches for floor information corresponding to the generated captured image among the plurality of pieces of floor information. For example, the vacuum cleaner searches for the floor information corresponding to the captured floor among the plurality of pieces of pre-stored floor information by analyzing the floor information from the captured image.

In operation S740, in response to the floor information corresponding to the captured floor being searched for, the vacuum cleaner controls a suction intensity thereof using the suction intensity information or the sterilizing function setup information corresponding to the searched floor information. The vacuum cleaner controls brush protrusion state information corresponding to the searched floor information to be set.

The control method of the vacuum cleaner further includes detecting a corner region from the generated captured image and increasing the suction intensity of the vacuum cleaner in the detected corner region.

According to the control method of a vacuum cleaner according to an exemplary embodiment automatically changes the suction intensity for the floor based on the setup information history set in using of the vacuum cleaner by the user. Therefore, it is convenient to clean the floor without a separate input through the setup of the vacuum cleaner more suitable for the environment of the user.

The control method of a vacuum cleaner according to an exemplary embodiment is implemented in the vacuum cleaner of FIGS. 1 to 4. The control method of a vacuum cleaner according to an exemplary embodiment is implemented with a program code stored in various types of recording media and executed by a CPU or the like.

For example, the code for executing the above-described methods is stored in various types of terminal-readable media such as a RAM, a flash memory, a ROM, an erasable programmable ROM (EPROM), an electrically erasable and programmable ROM (EEPROM), a register, a hard disc, a removable disc, a memory card, a USB memory, or a compact disc (CD)-ROM.

Figure 8:
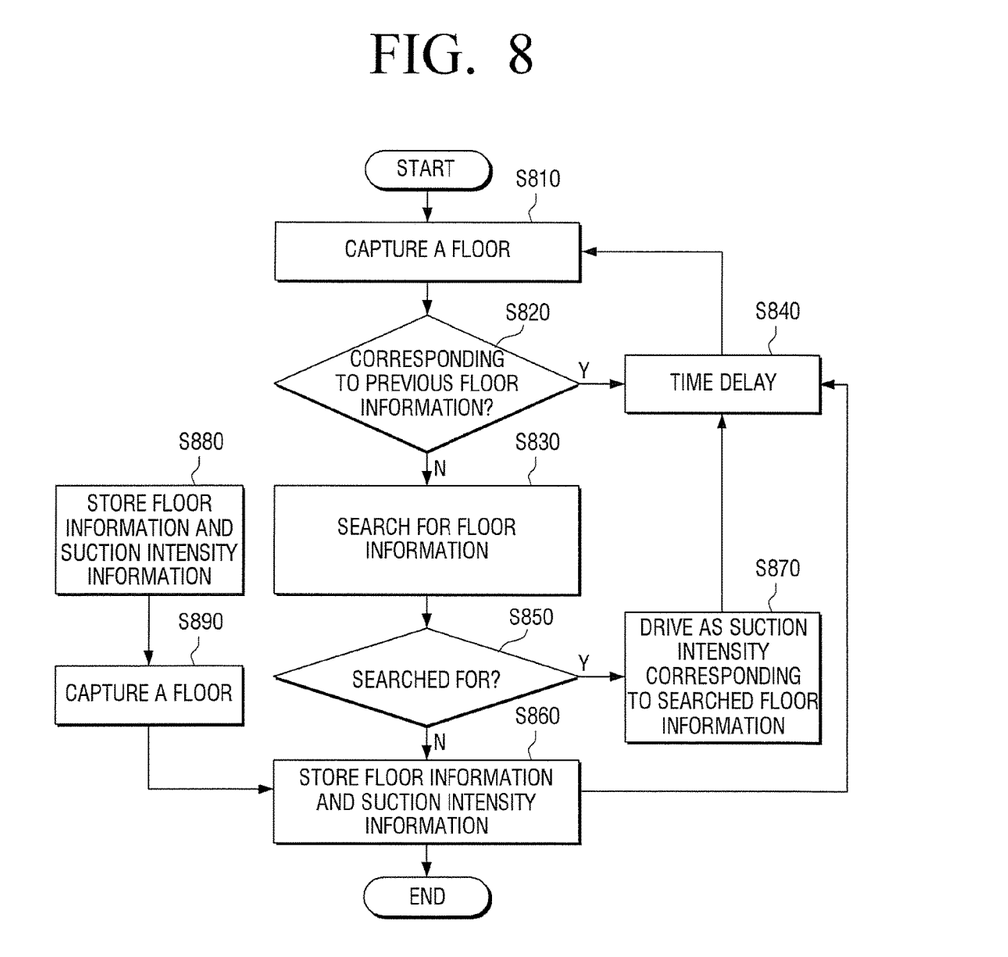
FIG. 8 illustrates a storing operation of FIG. 7 in detail.

FIG. 8 is a flowchart illustrating a storing operation of FIG. 7 in detail.

Referring to FIG. 8, a vacuum cleaner images a floor and generates a captured image in operation S810. In operation S820, the vacuum cleaner extracts floor information by analyzing the generated captured image and determines whether or not the vacuum cleaner cleans the same floor by determining whether or not the extracted floor information is corresponding to previous floor information.

In response to being determined that the floor information analyzed from the captured image of the floor currently captured is corresponding to the previous floor information in operation S820, the vacuum cleaner generates a preset time delay in operation S840. The preset time delay is a pre-analyzed time according to the time required for cleaning one room in cleaning of the floor by the user. The state in which the floor information analyzed from the captured image of the floor currently captured is corresponding to the previous floor information is determined that the vacuum cleaner cleans the same floor. In this state, the vacuum cleaner delays the imaging of the floor for a preset time in which the floor is captured again, and the vacuum cleaner continuously performs cleaning according to the previous set information. After the preset time, the vacuum cleaner captures the floor again in operation S810.

In response to being determined that the floor information analyzed from the captured image is not corresponding to the previous floor information in operation S820, that is, in response to being determined that a cleaning place is changed, the vacuum cleaner searches for pre-stored floor information corresponding to the floor information of the captured floor in operation S830. It is determined that the searched floor information is the same as the stored floor information for the floor in response to the pre-stored floor information being coincident with the floor information analyzed from the captured image or in response to having similarity of a preset threshold value or more.

In operation S850, the vacuum cleaner determines whether or not the floor information corresponding to the generated captured image for the floor is searched for. In response to the floor information being pre-stored due to the existence of the history in which the vacuum cleaner performs cleaning on the captured floor, the corresponding floor information is searched for.

In response to the floor information corresponding to the generated captured image for the floor being searched for in operation S850, the vacuum cleaner is controlled using the suction intensity information corresponding to the searched floor information in operation S870.

In operation S840, the vacuum cleaner is driven as the suction intensity corresponding to the searched floor information for the floor for a preset time, and the vacuum cleaner performs imaging on the floor again in response to the preset time being completed in operation S810.

In response to the floor information corresponding to the generated captured image for the floor being not searched for in operation S850, the current captured floor is a new floor having no cleaning history, and the vacuum cleaner stores the analyzed floor information and the suction intensity information set in the vacuum cleaner in operation S860. The vacuum cleaner performs a process of next cycle after the preset time delay in operation S840.

In response to an operation for changing the suction intensity of the vacuum cleaner being input by the user in operation S880, the vacuum cleaner captures the floor in operation S890 and stores the information floor analyzed from the captured image and the suction intensity input by the user in operation S860. In response to the present floor information being exist, the vacuum cleaner updates the suction intensity information to the suction intensity information newly input by the user.

According to the information storage method of a vacuum cleaner according to an exemplary embodiment automatically changes the strength of the suction intensity of the vacuum cleaner based on the using history of the user, and the user performs the cleaning through the optimum setup of the vacuum cleaner according to the individual environment of the user without the manual cumbersome operation of the suction intensity by the user.

The exemplary embodiment has described that all configuration components are combined in one or operated in the combined state, but this is not limited thereto. That is, one or more components are selectively combined and operated within the spirit of the inventive concept. For example, all the components are independently implemented with pieces of hardware. In another example, the components are selectively partially or entirely combined and are implemented with computer program having a program module that performs a portion of functions or the whole functions combined in one piece or a plurality of pieces of hardware. The codes or segments constituting the computer program are inferred by those skilled in the art. The computer program is stored in a non-transitory computer-readable media, and read out and executed by the computer, and thus the exemplary embodiment is implemented.

The non-transitory readable medium is not a medium configured to temporarily store data such as a register, a cache, or a memory but an apparatus-readable medium configured to permanently or semi-permanently store data. For example, the programs is stored in the non-transitory apparatus-readable medium such as a compact disc (CD), a digital versatile disc (DVD), a hard disc, a Btu-ray disc, a USB, a memory card, or a ROM, and provided.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A vacuum cleaner comprising:
an imaging unit configured to capture a floor and generate a captured image;
a storage unit configured to store a plurality of pieces of floor information and suction intensity information of the vacuum cleaner corresponding to each of the plurality of pieces of floor information; and
a controller configured to search for floor information corresponding to the captured image among the plurality of pieces of floor information, and control a suction intensity of the vacuum cleaner using suction intensity information corresponding to the searched floor information,
wherein the controller is further configured to, when the floor information corresponding to the captured image is not stored in the storage unit, automatically update the floor information stored in the storage unit by matching a current suction intensity of the vacuum cleaner to the floor information corresponding to the captured image and storing the floor information matched with the current suction intensity of the vacuum cleaner in the storage unit.

2. The vacuum cleaner as claimed in claim 1, wherein the floor information includes at least one piece of information of a color and pattern of the floor, and
the controller is further configured to search for the floor information corresponding to the generated captured image by analyzing the at least one piece of information of the color and pattern of the floor in the captured image.

3. The vacuum cleaner as claimed in claim 1, further comprising a manipulator configured to receive a suction intensity in which the vacuum cleaner performs suction on a surface to be cleaned in the floor,
wherein the controller is further configured to store the floor information corresponding to the captured image and the suction intensity that is received through the manipulator and is corresponding to the floor information.

4. The vacuum cleaner as claimed in claim 3, wherein, in response to the suction intensity information corresponding to the floor information being pre-stored, the controller is further configured to update the pre-stored suction intensity information to the received suction intensity.

5. The vacuum cleaner as claimed in claim 1, wherein the controller is further configured to detect a corner region from the captured image, and the controller is further configured to increase the suction intensity of the vacuum cleaner in response to the corner region being detected.

6. The vacuum cleaner as claimed in claim 1, wherein the storage unit is further configured to store protrusion state information of a brush corresponding to each of the plurality of pieces of floor information, and
the controller is further configured to control a protrusion state of the brush in the vacuum cleaner using the protrusion state information of the brush corresponding to the searched floor information.

7. The vacuum cleaner as claimed in claim 1, wherein the storage unit is further configured to store setup information of a sterilizing function corresponding to each of the plurality of pieces of floor information, and
the controller is further configured to control the sterilizing function of the vacuum cleaner using the setup information of the sterilizing function corresponding to the searched floor information.

8. The vacuum cleaner as claimed in claim 1, further comprising:
a main body configured to suck air and collect dust in the air;
a suction nozzle assembly configured to be in contact with the floor and suck the air;
an extension passage configured to couple the main body and the suction nozzle assembly, and transfer the air sucked from the floor to the main body; and
a handle member located in one side of the extension passage and gripped by a user,
wherein the imaging unit is provided in the handle member and further configured to capture the floor around the suction nozzle assembly.

9. The vacuum cleaner as claimed in claim 1, further comprising:
a main body configured to suck air and collect dust in the air;
a suction nozzle assembly configured to be in contact with the floor and suck the air;
an extension passage configured to couple the main body and the suction nozzle assembly, and transfer the air sucked from the floor to the main body; and
a handle member located in one side of the extension passage and gripped by a user,
wherein the imaging unit is provided in the suction nozzle assembly and further configured to capture the floor around the suction nozzle assembly.

* * * * *